United States Patent
Abidogun et al.

(10) Patent No.: US 8,265,591 B1
(45) Date of Patent: Sep. 11, 2012

(54) BLOCKING SUBSCRIBERS DEFAULTING PAYMENT FROM NETWORK ACCESS

(75) Inventors: Ayodeji Abidogun, Overland Park, KS (US); Nandana T. Maddumakumara, Overland Park, KS (US); Badri P. Subramanyan, Overland Park, KS (US); Piyush Upadhyay, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 12/698,496

(22) Filed: Feb. 2, 2010

(51) Int. Cl.
*H04W 74/00* (2009.01)

(52) U.S. Cl. ............. 455/406; 705/34; 705/35; 705/41; 455/403

(58) Field of Classification Search ............... 705/34, 705/41; 455/403
See application file for complete search history.

(56) References Cited

U.S. PATENT DOCUMENTS

| | | | |
|---|---|---|---|
| 7,320,033 B2 * | 1/2008 | Bradfield et al. | 709/225 |
| 7,634,446 B2 | 12/2009 | Jones et al. | |
| 7,844,245 B1 * | 11/2010 | Farkhondeh et al. | 455/403 |
| 7,937,743 B2 * | 5/2011 | Park et al. | 455/435.1 |
| 2002/0042763 A1 * | 4/2002 | Pillay et al. | 705/35 |
| 2005/0267974 A1 * | 12/2005 | Panasyuk et al. | 709/228 |
| 2007/0214083 A1 * | 9/2007 | Jones et al. | 705/41 |
| 2009/0172798 A1 * | 7/2009 | Upp | 726/10 |
| 2010/0131638 A1 * | 5/2010 | Kondamuru | 709/224 |

* cited by examiner

*Primary Examiner* — Ryan Zeender
*Assistant Examiner* — Hunter Wilder

(57) ABSTRACT

Computer media, systems, and methods for blocking subscriber network access and managing subscriber network access are provided. A subscriber account, having an associated wireless device with a network identifier, is determined to be in payment default. An updated network identifier that reflects the default status is assigned and transmitted to the wireless device. Subsequent requests for network access from the wireless device will be redirected to a bill payment website, at least in part because the updated network identifier indicates that the subscriber account associated with the wireless device is in payment default.

18 Claims, 5 Drawing Sheets

US 8,265,591 B1

BLOCKING SUBSCRIBERS DEFAULTING PAYMENT FROM NETWORK ACCESS

BACKGROUND

Mobile phones and wireless devices in general are continually becoming more technologically advanced. Many mobile phones and other wireless devices are now able to access the Internet with varying degrees of functionality. Some conventional wireless devices may not be able to display website content in a device-friendly manner. As a result, a gateway, such as a hypertext transfer protocol (HTTP) gateway implemented using the wireless application protocol (WAP) standard, is used to modify website content to allow the conventional devices to better display the website content.

Gateways additionally allow service providers to dynamically control subscriber network access and block subscribers who have not paid their account bill from accessing the network. As wireless device technology has improved, however, devices are increasingly able to properly display website content without the help of a gateway, bypassing both the gateway and gateway-implemented access controls.

SUMMARY

Embodiments of the present invention relate to systems and methods for blocking subscribers whose accounts are in default from accessing content on a network and for managing subscriber accounts. The systems and methods describe monitoring payment information for a subscriber's account and, if the subscriber has defaulted on payment, assigning wireless devices associated with the account an updated network identifier that indicates the account is in default. Subsequent requests from the wireless devices to access content on the network are redirected to a bill payment website.

In one embodiment, it is determined that a subscriber having an account has defaulted on payment for the account. A wireless device having a first network identifier is associated with the account. The wireless device is then assigned a second network identifier that replaces the first network identifier. The second network identifier indicates that the account is in default. Received requests for network access are then redirected to a bill payment website based at least in part on the second network identifier.

In another embodiment, a subscriber access management system is provided. The system includes a subscriber data store containing subscriber account billing information and a payment component that accesses the subscriber data store and determines if subscribers have defaulted on payment for associated subscriber accounts. Each subscriber account has one or more associated wireless devices that each have a network identifier. The system also includes an over-the-air update component that transmits network identifier updates to the wireless devices according to a state of subscriber account default. The system further includes a bill payment website for facilitating subscriber account payments as well as an access management component that, after receiving a request from a wireless device associated with an account in default, redirects the requesting wireless device to the bill payment website.

In still another embodiment, it is determined that a subscriber has defaulted on payment for an account. A wireless device having a first network identifier is associated with the account. An over-the-air update is transmitted to the associated wireless device assigning the device a second network identifier that replaces the first network identifier. The second network identifier indicates that the account is in default. Received requests for network access are then redirected to a bill payment website based at least in part on the second network identifier. Once account payment is received, a second over-the-air update is transmitted to the wireless device assigning the device a third network identifier that does not indicate the account is in default. Subsequent requests for network access by the wireless device are granted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Illustrative embodiments of the present invention are described in detail below with reference to the attached drawing figures, wherein.

DETAILED DESCRIPTION

Figure 1:
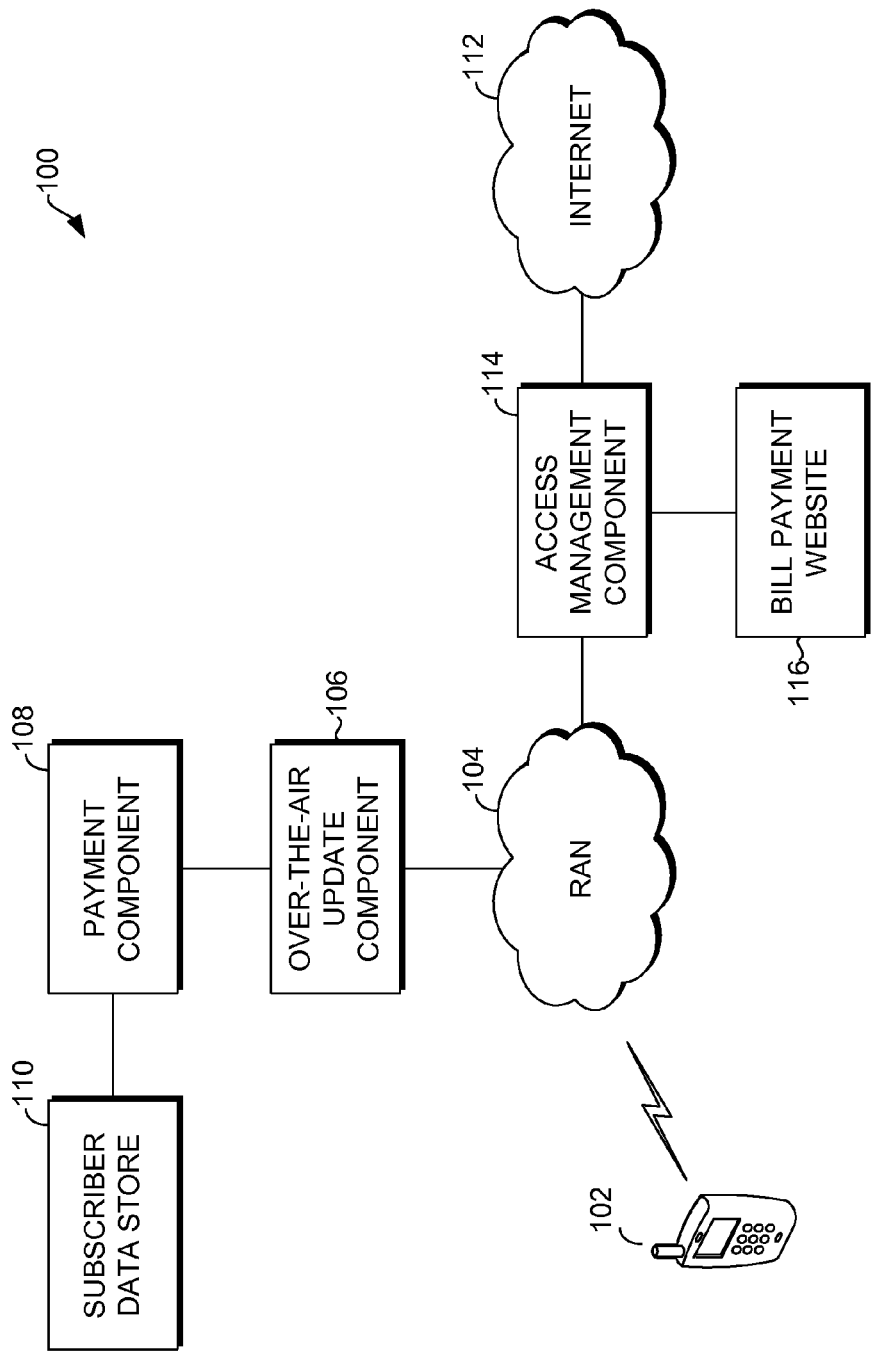
FIG. 1 is a block diagram of a subscriber access management system according to an embodiment of the present invention.

The subject matter of embodiments of the present invention is described with specificity herein to meet statutory requirements. However, the Detailed Description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| AAA | Authentication, Authorization, and Accounting |
| CD-ROM | Compact Disk Read Only Memory |
| CDMA | Code Division Multiple Access |
| DVD | Digital Versatile Disc |
| EEPROM | Electrically Erasable Programmable Read Only Memory |
| GGSN | Gateway GPRS (General Packet Radio Service) Support Node |

-continued

| GSM | Global System for Mobile Communication |
|---|---|
| HTTP | Hypertext Transfer Protocol |
| IP | Internet Protocol |
| IWF | Interworking Function |
| NAI | Network Access Identifier |
| PDA | Personal Digital Assistant |
| PDSN | Packet Data Serving Node |
| RAM | Random Access Memory |
| RAN | Radio Access Network |
| ROM | Read Only Memory |
| SGSN | Serving GPRS (General Packet Radio Service) support node |
| WAP | Wireless Application Protocol |

Further, various technical terms are used throughout this description. An illustrative resource that expands upon various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and non-removable media, and contemplates media readable by a database, a switch, and various other network devices. By way of example, and not limitation, computer-readable media comprise media implemented in any method or technology for storing information and include computer storage media. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the invention relate to computer storage media storing computer-executable instructions for performing methods of blocking subscribers whose accounts are in default from accessing content on a network, subscriber access management systems, and computer storage media storing computer-executable instructions for performing methods of managing network access for subscriber accounts.

As discussed above, because of the technological advance of wireless devices, including mobile phones, the use of a gateway as an intermediary between a device and the Internet is decreasing. Web-enabled smart phones, for example, are often able to bypass the gateway. Less technologically advanced wireless devices, however, are required to communicate with the gateway, thus allowing a service provider to use the gateway to block subscribers who have not paid their bill. The gateway may redirect subscribers in default to a bill payment webpage. Such redirection makes it clear to a subscriber that the bill needs to be paid.

Subscribers using web-enabled smart phones and other advanced wireless devices do not communicate with the gateway and cannot be blocked from accessing the Internet or other network in the above manner. In a typical scenario, a web-enabled smart phone subscriber who has not paid her account bill will simply fail to authenticate and receive a connection failure error message. It is not readily apparent to the subscriber that payment default is the reason for the error. Such ambiguity in the error message may cause the subscriber to call customer support to determine why the connection failed, which wastes both service provider and subscriber time and resources.

A more subscriber-friendly way of managing the subscriber's access to the Internet can be accomplished by updating the network identifier associated with the subscriber's smart phone. By updating the network identifier to an identifier that indicates the subscriber's account is in default, the subscriber can be redirected to a bill payment website upon attempting to access the Internet rather than simply receiving an ambiguous error message that may require a customer support call. The subscriber can then pay her bill and have access restored.

FIG. 1 illustrates a block diagram of a subscriber access management system 100. Wireless device 102, which may be a web-enabled smart phone, personal digital assistant (PDA), or other device capable of accessing web content, is in communication with radio access network (RAN) 104. Wireless device 102 has a first network identifier. In some embodiments, the network identifier is a network access identifier (NAI). RAN 104 may be implemented in code division multiple access (CDMA), global system for mobile communication (GSM), or another standard. Over-the-air update component 106 communicates with wireless device 102 over RAN 104 and transmits updated network identifiers to wireless device 102 that correspond to the payment default status of the subscriber account associated with wireless device 102. Payment component 108 accesses subscriber data store 110, which contains subscriber account billing information, to determine if a subscriber's account is in payment default.

If the subscriber account is in default, payment component 108 assigns wireless devices associated with the subscriber account, including wireless device 102, new network identifiers to reflect the default status. Accordingly, over-the-air update component 106 transmits a second network identifier over RAN 104 to wireless device 102. The second network identifier replaces the first network identifier. When wireless device 102 subsequently requests access to the Internet 112, access management component 114 redirects wireless device 102 to bill payment website 116, at least in part because the second network identifier indicates that the subscriber account associated with wireless device 102 is in default. The subscriber may then use bill payment website 116 to pay her bill and restore access. Bill payment website 116 may be accessible through the Internet 112 or may be an intranet website available only through the service provider's network. The subscriber may also pay her bill over the phone, by accessing the service provider's website from a computer, or by other means.

After the subscriber data store is updated to reflect payment, payment component 108 assigns a third network identifier to wireless device 102. The third network identifier may be the same as the first network identifier. The third network identifier does not indicate that the subscriber account associated with wireless device 102 is in default. In some embodiments, the network identifier indicates affirmatively that the account is not in default. In other embodiments, the network identifier simply does not provide an indication that the account is in default. Over-the-air update component 106 transmits the third network identifier over RAN 104 to wireless device 102. When wireless device 102 subsequently requests access to the Internet 112, access management component 114 grants access at least in part because the third network identifier does not indicate that the subscriber account associated with wireless device 102 is in default.

Over-the-air update component 106, payment component 108, subscriber data store 110, and access management component 114 can each be separate servers or other computers or groups of servers or computers or can represent functionality on a particular computer. As recognized by those having ordinary skill in the art, networks may employ a variety of components such as servers, routers, data stores, switches, etc. in a variety of configurations.

Figure 2:
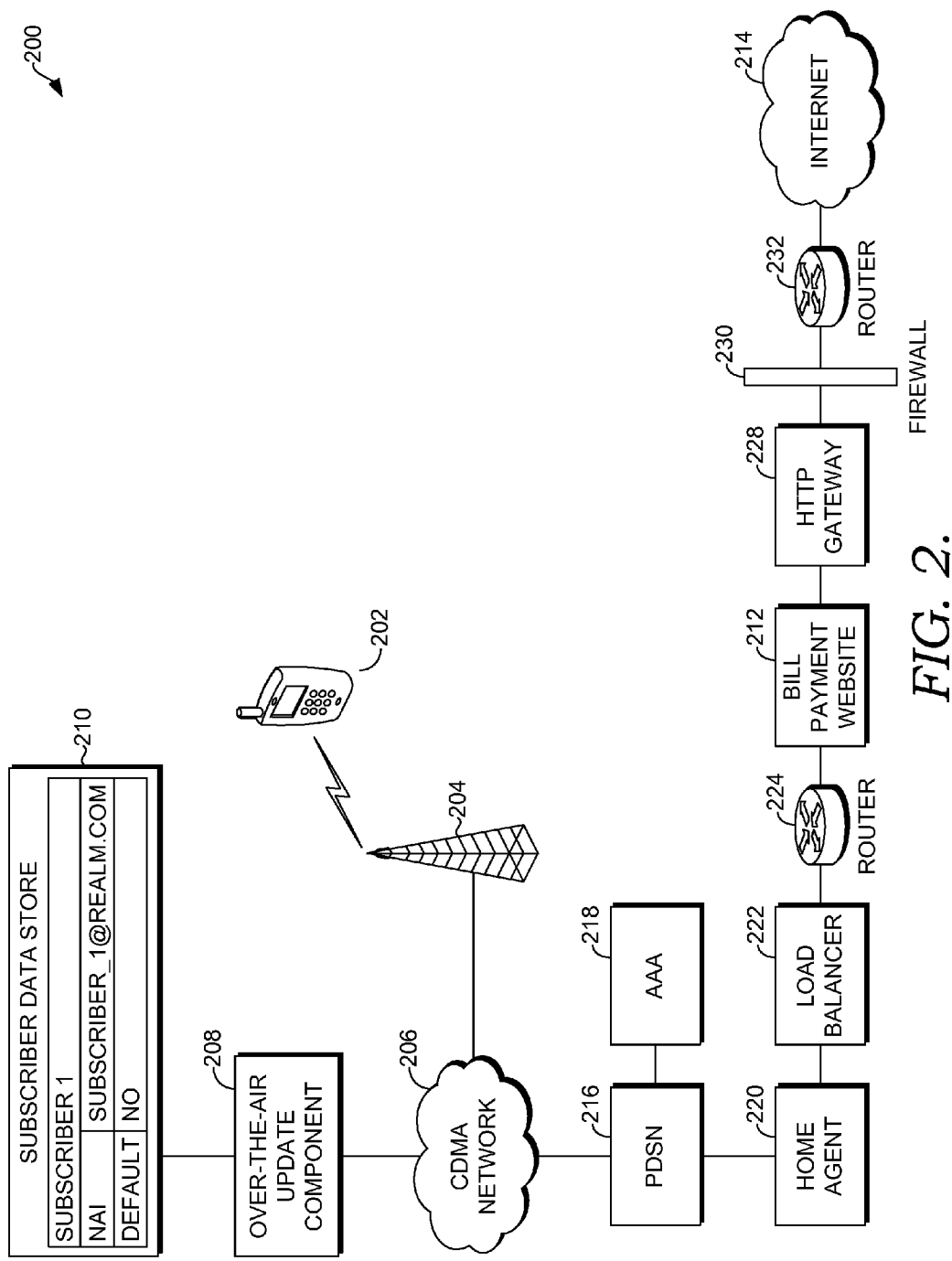
FIG. 2 is a block diagram of a CDMA subscriber access management system according to an embodiment of the present invention.

An embodiment of a subscriber management access system 200 implemented over a CDMA RAN is illustrated in FIG. 2. Wireless device 202 communicates via cell tower 204 with CDMA network 206. Wireless device 202 is associated with a subscriber account belonging to "subscriber_1" and has an assigned network access identifier (NAI). As discussed previously, other network identifiers may be used. Over-the-air update component 208 is in communication with CDMA network 206 and subscriber data store 210. Subscriber data store 210 contains subscriber account billing information such as payment history, balance due, billing statements, etc. and may also contain additional information such as the NAI of each wireless device associated with each subscriber account. In some embodiments, a payment default state is also stored that indicates whether the account is in default for lack of payment.

Data store 210 shows a sample record for subscriber_1, including subscriber_1's NAI, "subscriber_1@realm," as well as subscriber_1's payment default state of "no." Subscriber information can be stored and organized in a variety of ways. Subscriber data store 210 may contain functionality to determine that a subscriber is in payment default. In some embodiments, this functionality is embodied on one or more other components in system 200. In some embodiments, subscriber data store 210 is in communication with bill payment website 212, where subscribers can pay their subscriber account bills.

If subscriber data store 210 determines that the subscriber account associated with subscriber_1 is in default, the "default" value in subscriber_1's record in data store 210 is updated to "yes." Subscriber data store 210 assigns wireless device 202, which is associated with subscriber_1's subscriber account, an updated NAI to reflect that the account is in payment default. In this embodiment, wireless device 202's NAI is updated from "subscriber_1@realm" to "subscriber_1@newrealm." "Newrealm" indicates that the subscriber account is in payment default. Over-the-air update component 208 transmits the updated NAI to wireless device 202, where "subscriber_1@newrealm" replaces "subscriber_1@realm." When wireless device 202 subsequently requests access to the Internet 214, wireless device 202 is redirected to bill payment website 212, at least in part because the second network identifier indicates that the subscriber account associated with wireless device 202 is in default.

After payment for subscriber_1's account has been received, subscriber data store 210 determines that subscriber_1's account is no longer in default and assigns the wireless devices associated with subscriber_1, including wireless device 202, updated NAIs to indicate that subscriber_1's account is not in default. The updated NAIs may simply be the original NAIs used before subscriber_1's account was determined to be in payment default. Alternatively, a completely new NAI may be assigned that indicates that while the account is not currently in default, it has been in default at one point, thus indicating that subscriber_1 is at risk for future defaults.

In one embodiment, wireless device 202's NAI is changed from "subscriber_1@newrealm" back to "subscriber_1@realm," and subscriber_1's "default" status is returned to "no." Subsequent requests by wireless device 202 to access the Internet 214 are now granted, at least in part because wireless device 202's NAI does not indicate that subscriber_1's account is in default.

When wireless device 202 accesses the Internet 214 or other networks, wireless device 202 communicates with the Internet 214 through CDMA network 206 and various components of one or more service providers' infrastructure. In a CDMA implementation, packet data serving node (PDSN) 216 initiates a data session with wireless device 202. PDSN 216 communicates with authentication, authorization, and accounting (AAA) server 218 and authenticates wireless device 202. PDSN 216 is also in communication with home agent 220.

In a GSM implementation, PDSN 216 is replaced with a serving GPRS (general packet radio service) support node (SGSN) and home agent 220 is replaced by a gateway GPRS (general packet radio service) support node (GGSN) and an interworking function (IWF). AAA server 218 is not present in a GSM implementation.

Home agent 220 communicates with wireless device 202 after wireless device 202 has been authenticated by AAA server 218. Home agent 220 is part of a mobile internet protocol (IP) implementation in system 200. Mobile IP is well known in the art. A brief overview of mobile IP is included here to provide context for home agent 220. Mobile IP allows a wireless device to retain the IP address assigned by a home network independent of the device's current location. To accomplish this, mobile IP provides a system of home agents and foreign agents. Each network has a home agent, such as home agent 220, that maintains a database or listing of wireless devices that identify the network as "home." Foreign agents keep track of visiting wireless devices whose home network is a network other than the foreign agent's network. Thus, when a wireless device travels among networks, the wireless device maintains one IP address no matter which network the device enters. In FIG. 2, wireless device 202 is in its home network. Therefore, no foreign agents are shown. Mobile IP(v4) is described in greater detail in Internet Engineering Task Force (IETF) RFC 3344 and IETF RFC 4721. Mobile IP(v6) is described in IETF RFC 3775.

Home agent 220 assigns an IP address to wireless device 202 and keeps track of both wireless device 202's IP address and NAI (or other network identifier). When wireless device 202 receives an IP address from home agent 220, or checks in with home agent 220 after having previously received an IP address, Internet access requests sent from wireless device 202 are transmitted first to home agent 220 and then to the Internet 214. A variety of other components may also be in the communication path between home agent 220 and the Internet 214, such as load balancer 222, routers 224 and 232, and firewall 230. These components may be in communication with each other through one or more service provider networks. Communication between home agent 220 and the Internet 214 may not always involve each of these components. In one embodiment, bill payment website 212 is located between home agent 220 and firewall 230. Gateway 228 is bypassed by advanced wireless devices. Gateway 228 is typically an HTTP gateway implemented using WAP. Such gateways are interchangeably referred to as "HTTP gateways" or "WAP gateways." More information regarding WAP can be found in various releases by the Open Mobile Alliance.

When home agent 220 receives a request to access the Internet 214 from wireless device 202, home agent 220 examines wireless device 202's NAI and determines if wireless device 202 should be allowed to access the Internet 214 or if wireless device 202 should be redirected to bill payment website 212. In the embodiment discussed above, "realm" does not indicate that the subscriber account associated with wireless device 202 is in default. Thus, if wireless device 202's NAI is "subscriber_1@realm," wireless device 202 is connected to the Internet 214. If wireless device 202's NAI is "subscriber_1@newrealm," however, wireless device 202 is redirected to bill payment website 212. "Newrealm" indicates that the associated subscriber account is in default. In addition to redirecting wireless device 202 to bill payment website 212 because of subscriber account default, home agent 220 may also transmit an error message explaining that the subscriber account is in default and that payment must be made in order to access the Internet 214. A similar message could also be a part of the content of bill payment website 212.

Figure 3:
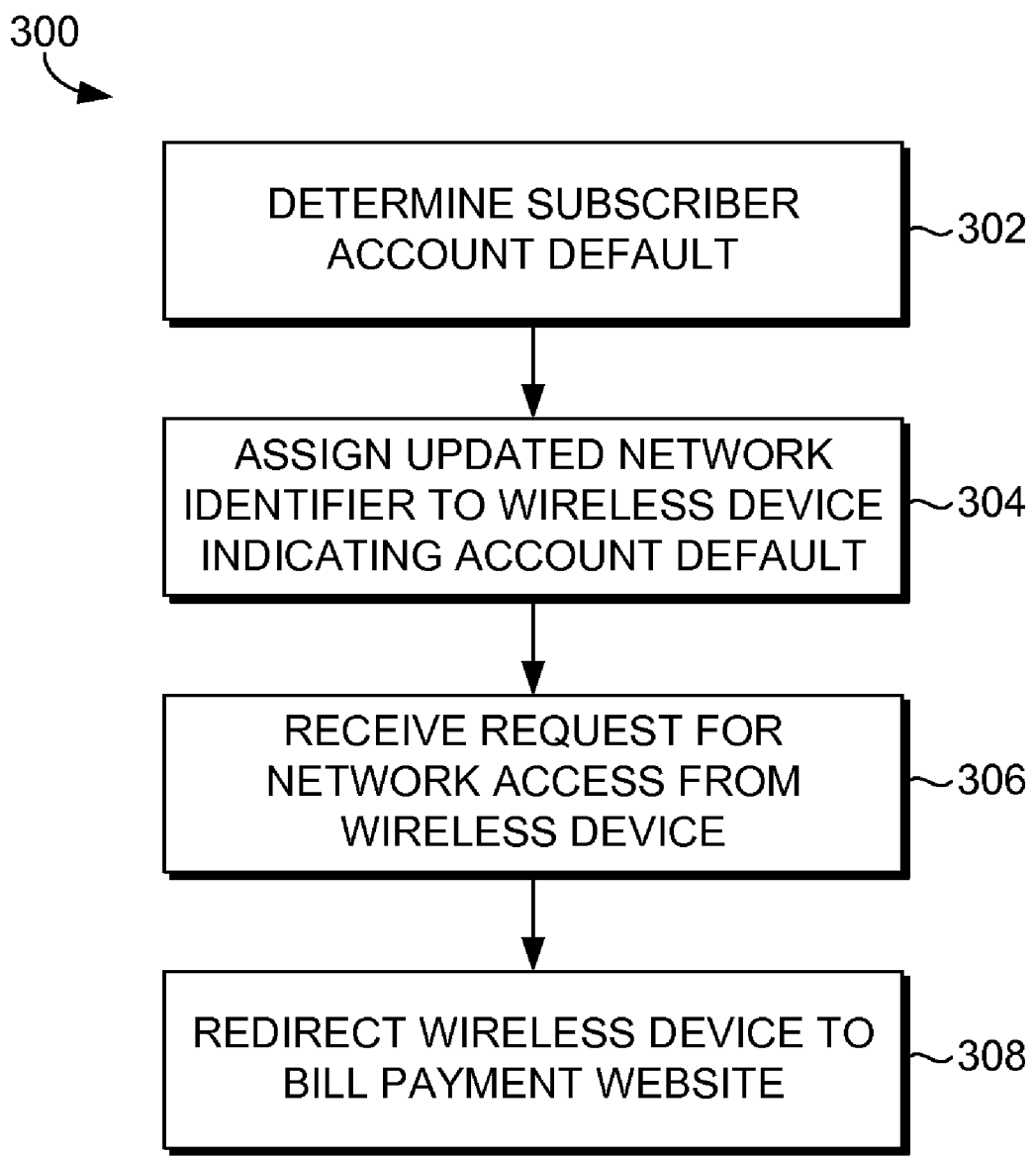
FIG. 3 is a flow chart of an exemplary method for blocking a subscriber whose account is in default from accessing content on a network.

FIG. 3 illustrates a method 300 for blocking a subscriber whose account is in default from accessing content on a network. In step 302, it is determined that a subscriber account is in payment default. Default may be determined by various factors or combinations of factors including amount of money owed, duration of time after last payment, and past payment history. In step 304, an updated network identifier is assigned to a wireless device associated with the subscriber account in default. The updated network identifier, which may be an NAI as discussed above, indicates that the subscriber account is in payment default. In step 306, a request for Internet access is received from the wireless device. The wireless device is then redirected to a bill payment website in step 308, at least in part because the device's network identifier indicates that the subscriber account associated with the device is in default. Thus, the wireless device is blocked from accessing the Internet and redirected to a bill payment website at least in part because the associated subscriber account is in default.

Figure 4:
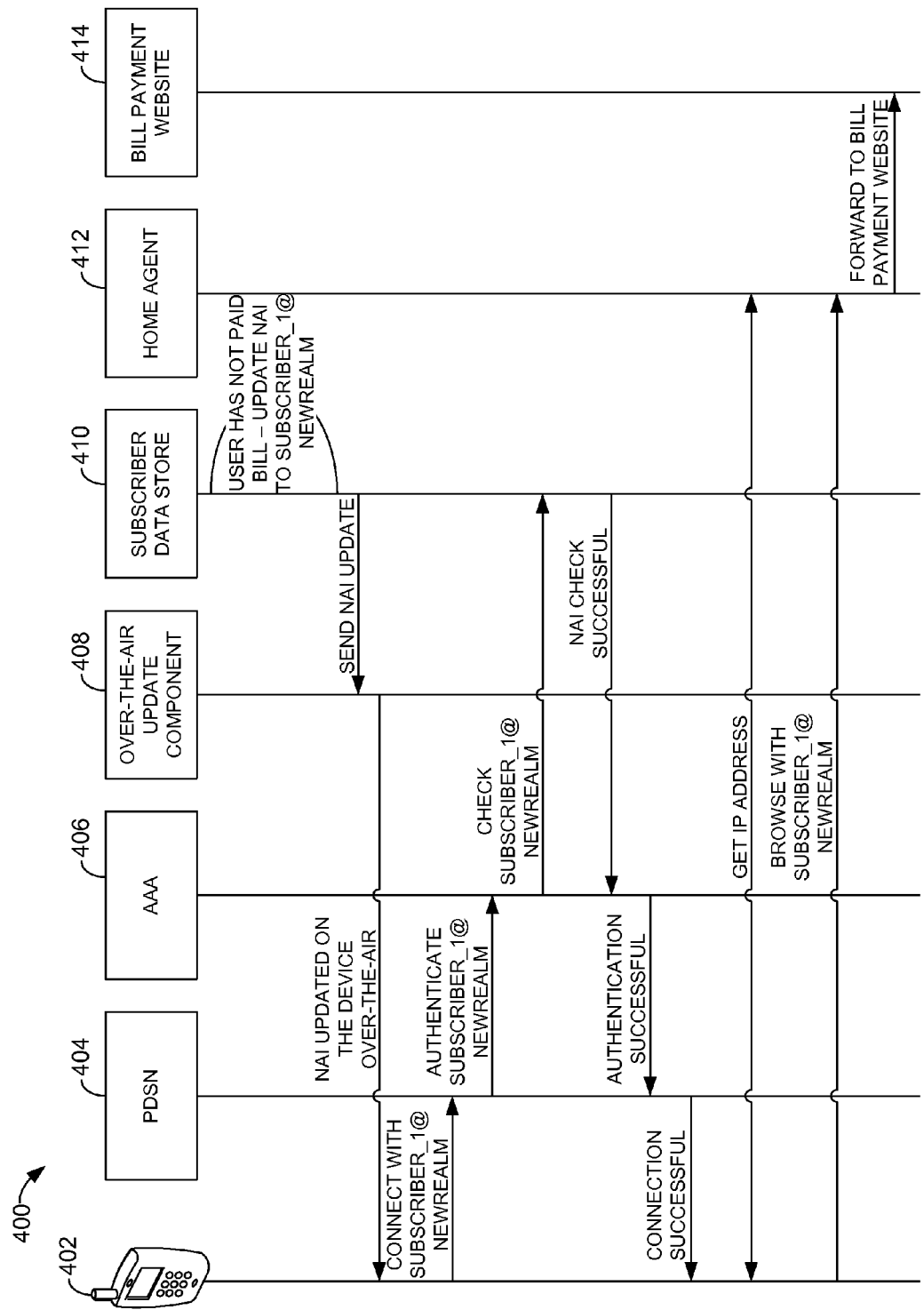
FIG. 4 is a flow chart of an exemplary method for blocking a subscriber whose account is in default from accessing content on a network, the method implemented on a subscriber access management system according to an embodiment of the present invention.

FIG. 4 illustrates an exemplary method 400 for blocking a subscriber whose account is in default from accessing content on a network, the method implemented on a subscriber access management system. Wireless device 402 is associated with an account belonging to subscriber_1 and has an NAI. Subscriber data store 410 determines that subscriber_1's account is in payment default. Subscriber data store 410 then transmits an NAI update to over-the-air update component 408. Over-the-air update component 408 transmits the NAI update back to wireless device 402. The updated NAI is "subscriber_1@newrealm." Wireless device 402 then connects to PDSN 404 with the updated NAI. PDSN 404 is part of a service provider's infrastructure. PDSN 404 authenticates wireless device 402 with AAA server 406. AAA server performs an NAI check with subscriber data store 410 to ensure that wireless device 402's NAI is the same as the record stored in subscriber data store 410. If the NAI check with subscriber data store 410 is successful, AAA server 406 informs PDSN 404 that authentication was successful. PDSN 404 then connects wireless device 402 to the service provider network.

Wireless device 402 is assigned an IP address by home agent 412. Home agent 412 may have previously assigned wireless device 402 an IP address. Wireless device 402 then requests Internet access. The request is sent to home agent 412. Instead of granting Internet access to wireless device 402, home agent 412 forwards wireless device 402 to bill payment website 414, at least in part because wireless device 402's updated NAI of "subscriber_1@newrealm" indicates that the subscriber_1's account is in payment default. A load balancer could also perform the function of either allowing Internet access or redirecting to bill payment website 414 based on wireless device 402's NAI.

Figure 5:
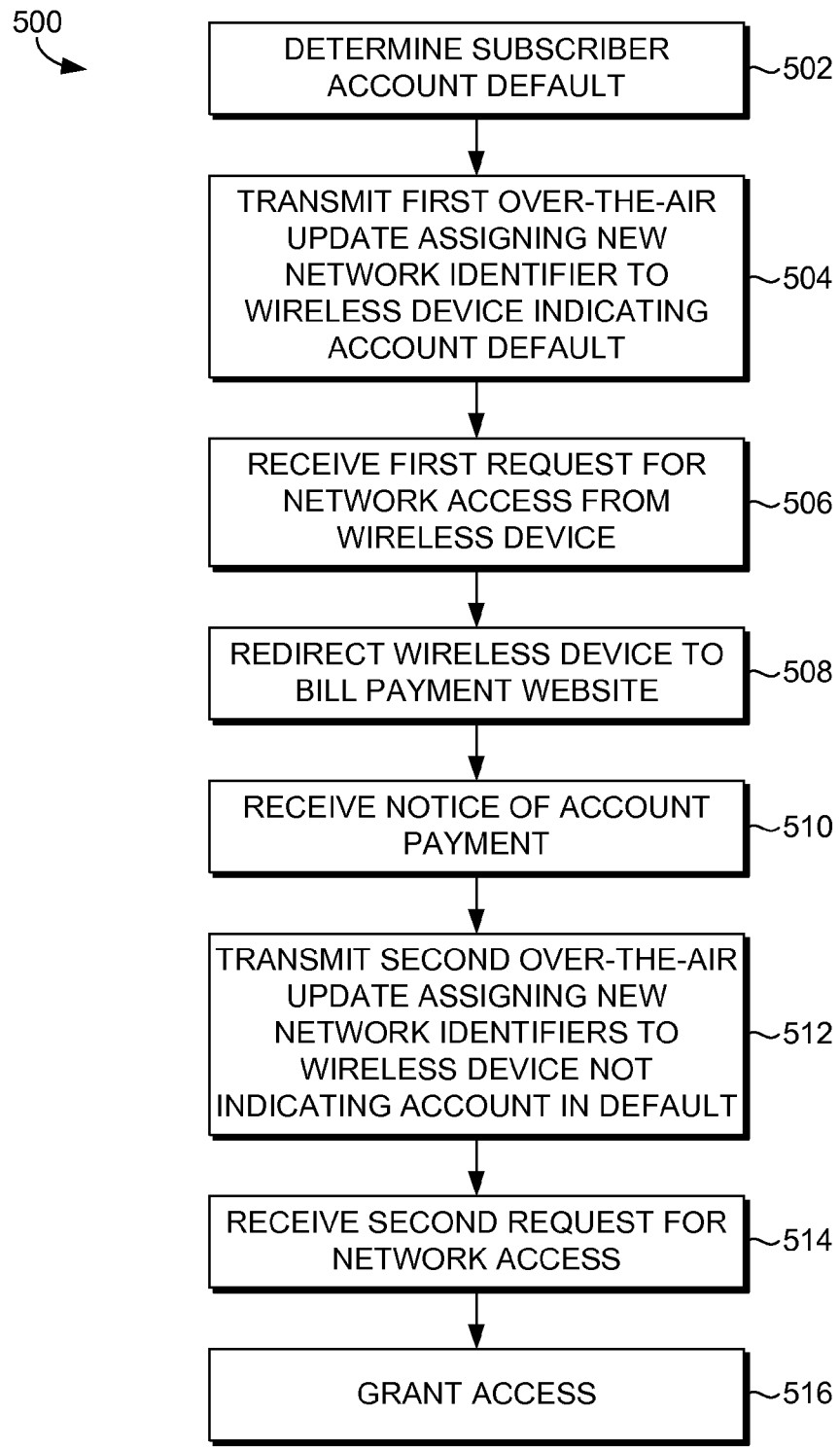
FIG. 5 is a flow chart of an exemplary method for managing network access for subscriber accounts.

FIG. 5 illustrates an exemplary method 500 for managing network access for subscriber accounts. In step 502, it is determined that a subscriber account is in payment default. The subscriber account has an associated wireless device having a network identifier, which may be an NAI. In step 504, an over-the-air update component transmits a new network identifier to the wireless device associated with the subscriber account in default. The new network identifier indicates that the subscriber account is in default. The new network identifier may be assigned by the over-the-air update component or by a user data store, payment component, or other system component. A first request for network access from the wireless device is received in step 506. The network the wireless device is requesting to access may be the Internet. The wireless device is redirected to a bill payment website in step 508, at least in part because the network identifier indicates the subscriber account is in default. The bill payment website facilitates payment of the bill associated with the subscriber account.

In step 510, notice is received that payment has been made in an amount sufficient for the subscriber account to no longer be in default. Payment could occur through the bill payment website, through a third-party website, or through other means such as a telephone call or paper check. As a result, in step 512 a second over-the-air update assigns another new network identifier to the wireless device. This network identifier does not indicate that the subscriber account associated with the wireless device is in default. This network identifier may be the same as the original network identifier assigned to the wireless device before it was determined in step 502 that the subscriber account was in default. In step 514, a second request for network access is received from the wireless device. Network access is granted in step 516, at least in part because the wireless device's network identifier does not indicate that the subscriber account is in default. If the network identifier had indicated a subscriber account in default, the wireless device would have been redirected to a bill payment website as in step 508.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer storage media storing computer-executable instructions for performing a method of blocking a subscriber whose account is in default from accessing content on a network, the method comprising:

determining that a subscriber having an account has defaulted on payment for the account, the account having an associated wireless device having a first network identifier that indicates affirmatively that the account is not in default;

assigning the associated wireless device a second network identifier indicating that the account is in default, the second network identifier replacing the first network identifier;

receiving a request for network access from the associated wireless device; and in response to receiving the request for network access and without communicating with a gateway, redirecting the associated wireless device to a bill payment website based upon the second network identifier.

2. The media of claim 1, wherein the wireless device communicates through a code division multiple access (CDMA) network.

3. The media of claim 1, wherein the first and second identifiers are network access identifiers (NAIs).

4. The media of claim 1, wherein the associated wireless device is a web-enabled smart phone.

5. The media of claim 1, wherein assigning the associated wireless device the second network identifier includes transmitting an over-the-air update to the associated wireless device.

6. The media of claim 1, further comprising:
upon receiving notice of payment for the account, assigning the associated wireless device a third network identifier that does not indicate that the account is in default, the third network identifier replacing the second network identifier.

7. The media of claim 6, wherein the third network identifier is the same as the first network identifier.

8. The media of claim 6, further comprising:
receiving a second request for network access from the associated wireless device; and
in response to receiving the second request for network access, granting network access to the associated wireless device.

9. A subscriber access management system, comprising:
a subscriber data store containing subscriber account billing information;
a payment server that accesses the subscriber data store and determines if subscribers have defaulted on payment for associated subscriber accounts, each subscriber account having one or more associated wireless devices, each associated wireless device having a network identifier;
an over-the-air update component that transmit network identifier updates to wireless devices associated with the subscriber accounts according to a subscriber account default state, the updates affirmatively indicating that the subscriber accounts associated with the wireless devices are in default or are not in default;
a bill payment website for facilitating subscriber account payments; and
an access management component that, after receiving a request for network access from a wireless device, redirects the wireless device to the bill payment website without communicating with a gateway when the wireless device's network identifier indicates that the subscriber account associated with the wireless device is in default.

10. The system of claim 9, wherein the system is implemented to communicate with wireless devices through a code division multiple access (CDMA) network.

11. The system of claim 9, wherein the network identifiers are network access identifiers (NAIs).

12. The system of claim 9, wherein the access management component is a home agent.

13. The system of claim 9, wherein the access management component is a load balancer.

14. One or more computer storage media storing computer-executable instructions for performing a method of managing network access for subscriber accounts, the method comprising:
determining that a subscriber having an account has defaulted on payment for the account, the account having an associated wireless device having a first network identifier that indicates affirmatively that the account is not in default;
transmitting a first over-the-air update to the associated wireless device through the network, the first update assigning the associated wireless device a second network identifier indicating that the account is in default, the second network identifier replacing the first network identifier;
receiving a first request for network access from the associated wireless device;
in response to receiving the first request for network access and without communicating with a gateway, redirecting the associated wireless device to a bill payment site based upon the second network identifier indicating the subscriber account is in default;
upon receiving notice of payment for the account, transmitting a second over-the-air update to the associated wireless device through the network, the second update assigning the associated wireless device a third network identifier that does not indicate the account is in default, the third network identifier replacing the second network identifier;
receiving a second request for network access from the associated wireless device; and
in response to receiving the second request for network access, granting network access to the associated wireless device.

15. The media of claim 14, wherein the associated wireless device communicates through a code division multiple access (CDMA) network.

16. The media of claim 14, wherein the associated wireless device is a web-enabled smart phone.

17. The media of claim 14, wherein the first, second, and third network identifiers are network access identifiers (NAIs).

18. The media of claim 17, wherein the first and third network identifiers are the same.

* * * * *